C. E. HIATT.
COMPARATOR.
APPLICATION FILED OCT. 14, 1909.

1,121,835.

Patented Dec. 22, 1914.

Witnesses
Daniel Webster, Jr.
U. E. Steinbock

Inventor
Cassius E. Hiatt
By Cornelius D. Ehret
his Attorney

UNITED STATES PATENT OFFICE.

CASSIUS E. HIATT, OF PHILADELPHIA, PENNSYLVANIA, ASSIGNOR TO WESTINGHOUSE ELECTRIC & MANUFACTURING COMPANY, A CORPORATION OF PENNSYLVANIA.

COMPARATOR.

1,121,835.  Specification of Letters Patent.  Patented Dec. 22, 1914.

Original application filed May 25, 1909, Serial No. 498,160. Divided and this application filed October 14, 1909. Serial No. 522,515.

*To all whom it may concern:*

Be it known that I, CASSIUS E. HIATT, a citizen of the United States, residing in the city of Philadelphia, county of Philadelphia, and State of Pennsylvania, have invented a new and useful Comparator, of which the following is a specification.

My invention relates to electrical measuring apparatus and more particularly to measuring apparatus involving the use of thermojunctions, which, when heated, produce, as is well understood, an electric current; and such electric current I employ to produce an effect which shall be a measure of the unknown quantity.

My invention resides in apparatus for comparing two electro-motive forces or currents, both direct, both alternating, or one direct and one alternating. To this end I employ one or more pairs of thermojunctions connected in circuit with each other and in opposition to each other and produce an effect upon each thermojunction by the voltages or currents to be compared or measured until a balance is produced, whereby the unknown voltage or current may be read or determined.

My invention resides also in the method of comparing currents or electro-motive forces as hereinafter described.

Figure 1:
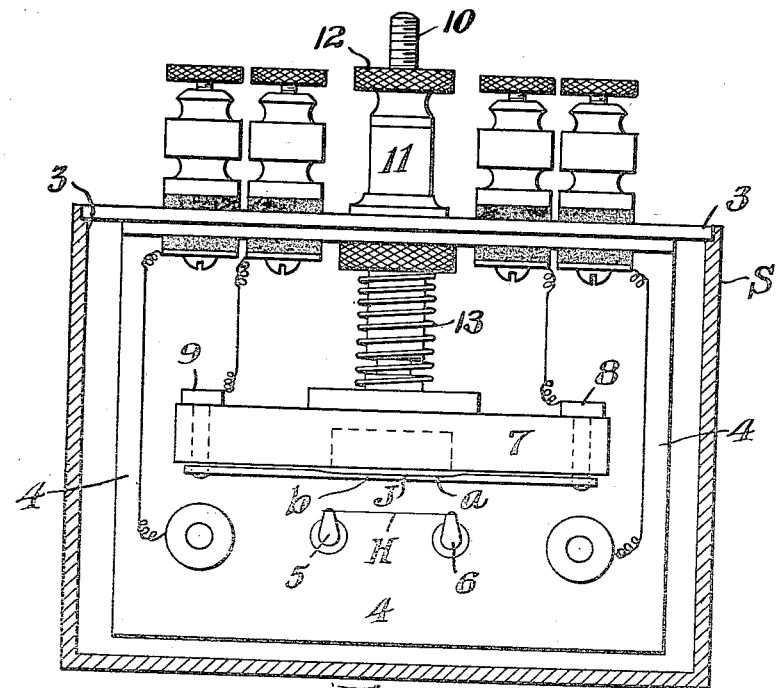
Figure 2:
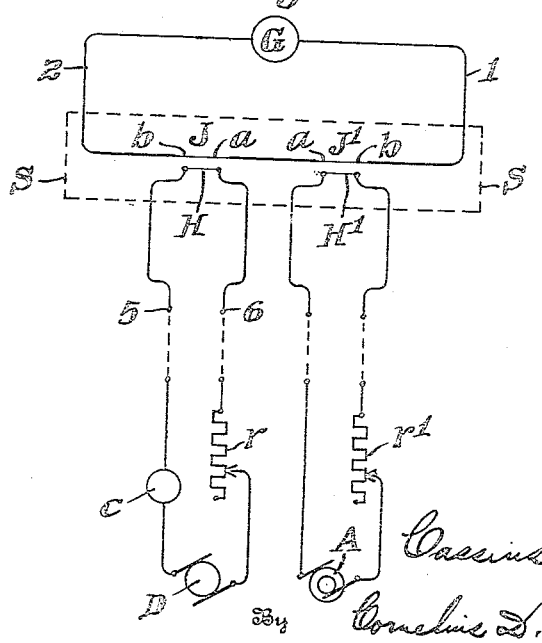

For an illustration of one of the forms my invention may take, reference is to be had to the accompanying drawing, in which:

Figure 1 is a vertical elevational view of a concrete form a part of the apparatus shown in Fig. 2 may take. Fig. 2 is a diagrammatic view of my comparator or means for comparing voltages or currents.

Referring to the drawing, G is a galvanometer of any suitable type and sensitiveness which is connected in series, by conductors 1 and 2, with the two similar and opposed thermojunctions J and J¹. These junctions may be composed of any known materials, such as copper and constantan, or antimony and bismuth. They are here shown as of antimony and bismuth, $a$ being the antimony and $b$ the bismuth.

H and H¹ are electric heaters disposed in proximity with the junctions J and J¹, respectively. The capacity and self-induction of each of the heaters H and H¹ are extremely small, and the resistance may be made relatively high and any suitable material may be used for the heating resistances H, H¹, it having been found that manganin serves very well.

The dotted rectangle S represents a suitable heavy shield surrounding the thermojunctions and their juxtaposed heaters, for shielding them from undesirable heating effects, drafts of air, or for any other suitable purpose.

The heaters H and H¹ are first connected in series with each other and a current of the order of magnitude of the current to be measured is passed through them. Then the heaters H and H¹ are moved to or away from their associated thermojunctions J and J¹ until the galvanometer or instrument G points at zero or gives no deflection. Since the thermojunctions J and J¹ are similar and since they are connected in opposition to each other with respect to the instrument G, it means that both junctions J and J¹ have been elevated to the same temperature, if the instrument G gives no deflection. This, in turn, means that the current through H and H¹ causes no deflection of the galvanometer and, therefore, equal and separate currents through H and H¹ will cause no deflection.

By the arrangement just described, the instrument has been put in condition for comparing two currents or two electro-motive forces. Assuming, first, that two currents are to be compared and as an example that the value of an alternating current is to be determined, the heater H¹ is connected in circuit with the source of alternating current A, sufficient resistance $r^1$ being assumed in the circuit to prevent the burning out of the heater H¹. Simultaneously, the heater H is connected in circuit with the source of direct current D and the adjustable resistance $r$ and a direct current ammeter $c$. The resistance $r$ is then so adjusted that the galvanometer G gives a zero deflection. This means that the heaters H and H¹ are traversed by equal currents, and the current is then read upon the ammeter $c$ in the direct current circuit. This means that the current in the alternating current circuit is the same as that measured by the ammeter $c$ in the direct current circuit. Or, for measuring very heavy alternating currents, the heater H¹ may be connected in shunt to a manganin or other shunt connected directly in series with the heavy alternating current to be measured. Then the heater $H^1$, which is subjected simply to the current due to the potential difference at the terminals of the large shunt and the resistance of the leads and connections of the heater $H^1$ being maintained uniform, the current measurement can be made, the reading on the ammeter $c$ in the direct current circuit being then multiplied by the necessary factor. The apparatus may also be used for comparing two direct currents in the same way and by the same process. Or two direct voltages or two alternating voltages may be compared, or an alternating voltage may be compared with a direct current voltage, and vice versa. All that is necessary in such voltage comparisons is to provide suitable non-inductive resistances which will insure that the currents passing through the heaters H and $H^1$ are directly proportional to the voltages. And by the same apparatus an alternating current or voltage of one frequency may be compared with an alternating current or voltage of another frequency.

In Fig. 1 is shown a portion of the apparatus as I have constructed it, to be used in accordance with Fig. 2. Depending from the top plate 3 is a thick plate 4 preferably of insulating material, upon which are supported the terminals 5 and 6 for one of the heaters, as H. Immediately above it, upon the block of insulating material 7, is supported the thermojunction J, having terminals at 8 and 9 connecting by the flexible conductors to binding posts upon the plate 3. A screw threaded rod 10 extends downwardly through the post 11 and by moving the thumb nut 12 the rod 10 is fed upwardly or downwardly, controlled by the spring 13, to cause the thermojunction J to approach or recede from the heater H, for the purpose heretofore described. On the opposite side of the plate 4 the heater $H^1$ and the thermojunction $J^1$ are similarly supported and movable with respect to each other as described in connection with junction J and heater H. The plate 4 and parts carried thereby fit into a suitable metallic or other casing constituting the shield S of Fig. 2, the top plate 3 closing the casing. The thermojunctions are preferably made very delicate so as to respond quickly to changes in temperature and the masses of material at the junctions are made very small and so arranged that heat is quickly conducted away from them.

This application is a division from my application Serial No. 498,160, filed May 25, 1909.

What I claim is:

1. The method of comparing electric currents which consists in opposing thermo-currents produced respectively and exclusively by the $C^2R$ heating effects of the compared currents, and adjusting one of said compared currents until the thermo-currents balance.

2. The method of measuring an electric current which consists in balancing a thermo-current produced exclusively by the $C^2R$ heating effect thereof against a thermo-current produced exclusively by the $C^2R$ heating effect of a known current.

3. A comparator for electric currents comprising opposed thermo-couples, non-inductive heating conductors respectively adjacent the thermo-couples and respectively traversed by the currents under comparison, and means for adjusting one of said currents until the currents produced by the thermo-couples balance.

4. In a comparator, opposed thermo-couples, a heater for each thermocouple, and means for adjusting said heaters and said thermocouples with respect to each other.

5. In a comparator, opposed thermo-couples, a heater for each thermocouple, means for adjusting said heaters and said thermocouples with respect to each other, and a shield surrounding said thermo-couples and heaters.

6. A comparator for electric currents comprising opposed thermo-couples, non-inductive heating conductors respectively adjacent the thermo-couples and respectively traversed by the currents under comparison, means for adjusting one of said currents until the currents produced by the thermo-couples balance, and means for adjusting the relative positions of the thermo-couples and heating conductors.

In testimony whereof I have hereunto affixed my signature in the presence of the two subscribing witnesses.

CASSIUS E. HIATT.

Witnesses:
ELEANOR T. MCCALL,
ANNA E. STEINBOCK.